(No Model.)
F. C. CHOATE.
POTATO PLANTER.
No. 584,325.  Patented June 15, 1897.
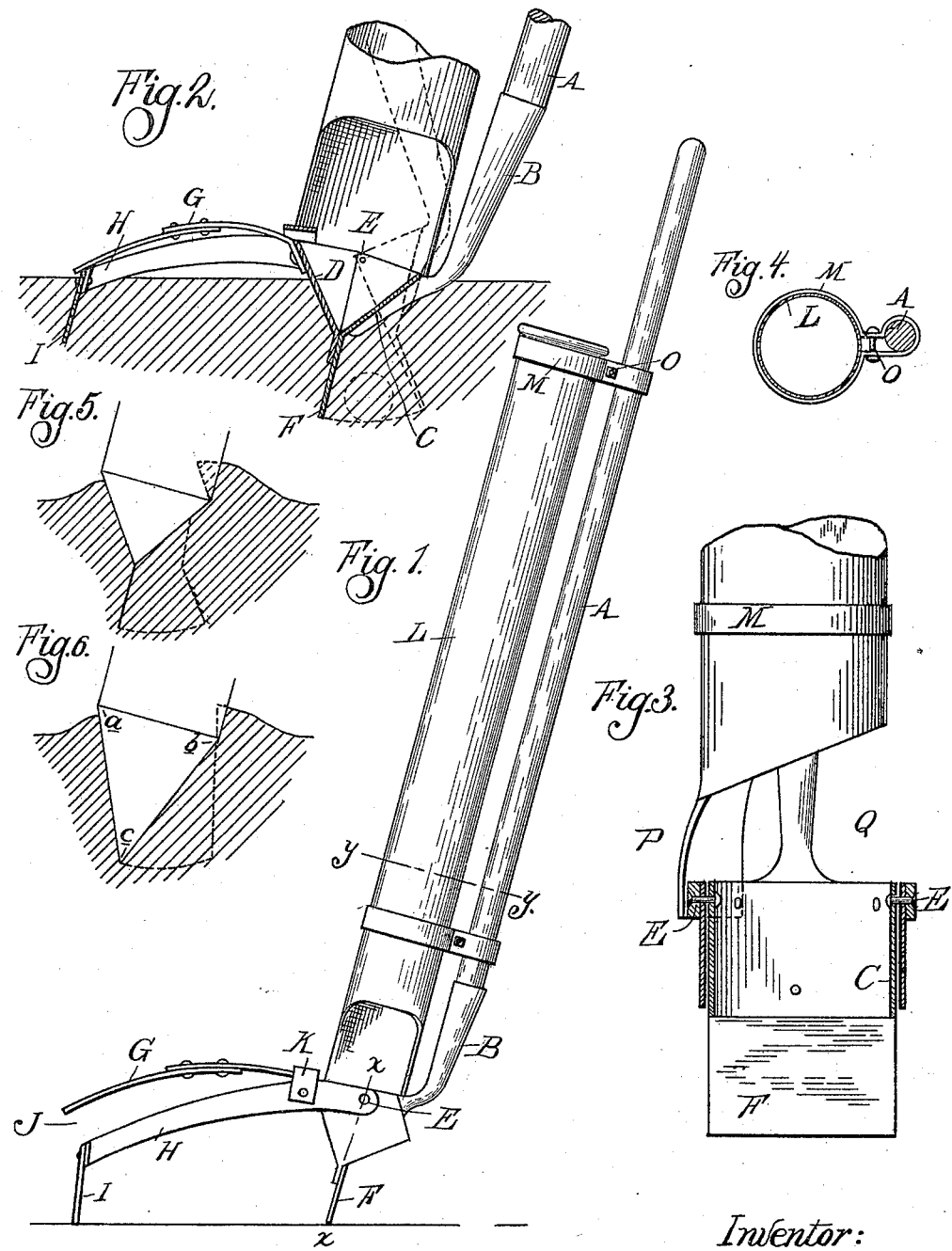
Witnesses:
Otto H. Barthel
M. B. O'Dogherty
Inventor:
Fred C. Choate,
By [signature]
Attorneys.

UNITED STATES PATENT OFFICE.

FRED C. CHOATE, OF GREENVILLE, MICHIGAN, ASSIGNOR, BY MESNE ASSIGNMENTS, TO THE AMERICAN HARROW COMPANY, OF DETROIT, MICHIGAN.

POTATO-PLANTER.

SPECIFICATION forming part of Letters Patent No. 584,325, dated June 15, 1897.

Application filed July 3, 1896. Serial No. 597,997. (No model.)

*To all whom it may concern:*

Be it known that I, FRED C. CHOATE, a citizen of the United States, residing at Greenville, in the county of Montcalm and State of Michigan, have invented certain new and useful Improvements in Potato-Planters, of which the following is a specification, reference being had therein to the accompanying drawings.

The invention relates to the construction of a planter especially designed for planting potatoes and similar seed.

The invention consists in the construction of the planting-hopper or beak which holds the seed and by means of which a hole is made into which the seed is dropped.

The invention further consists in the construction of a tube detachably and adjustably secured to the handle or operating-lever, which tube may be used for guiding the seed to the hopper.

The invention further consists in the construction, arrangement, and combination of the various parts.

In the drawings, Figure 1 is a side elevation of my improved device, showing it about to be inserted into the ground, with the tube attached. Fig. 2 is a section through the lower portion thereof, showing it as inserted into the ground and showing in full and dotted lines the different positions of the lever and hole-forming blade. Fig. 3 is a section on line $xx$ in Fig. 1. Fig. 4 is a cross-section on line $yy$, Fig. 1. Fig. 5 is a diagram showing the displacement of the earth in the use of my device, and Fig. 6 is a similar diagram showing the displacement of the earth with the usual type of ordinary construction of such jaws or hopper.

A is a handle or lever. At the lower end it is provided with a shank B, to which is secured a flanged plate C, which forms what I shall call the "stationary" jaw of the hopper.

D is a complementary hopper-section, the two parts of the hopper being pivoted near the top upon the bolts or rivets E.

F is a blade forming an extension below the hopper at the lower edge thereof, and this blade is designed to form the hole or recess in the earth into which the seed drops from the hopper. This blade should be upon whichever jaw is to be moved to form the hole. In this case, and what I deem the preferable construction, it is formed integral with and as an extension of the stationary jaw of the hopper, the word "stationary" being used only to define its relation to the handle or operating-lever.

If a device thus constructed were provided with a bearing for the movable or hinged jaw on the earth to keep it from rocking when the handle A were moved, which is a known device in such planters, it would work with reasonable satisfaction and as follows: The seed being placed in the hopper the operator would force the blade F into the ground, the hopper slightly entering, and then rocking the lever or handle A, the jaw D being held from movement by the bearing referred to, the lever would fulcrum on the pivot E and the blade F would move in the arc of a circle in the ground below the hopper, forming a hole below the same, into which the seed would drop as the hopper was opened by this movement. This is illustrated by the dotted lines in Fig. 2 and by the diagram Fig. 5. By making this hopper a comparatively shallow one and forming a hole by the single-blade extension below the same I obtain two advantages over the ordinary type of such machines: First, there is no possibility of the device picking up the potato or seed after it has fallen into the hole made by the blade, as often happens with the construction in which the hopper-jaws are of the same length and of substantially the shape shown in Fig. 6; second, with the construction shown in Fig. 6 the earth in the triangle $a\,b\,c$ is necessarily packed by the insertion of the beak into the ground and is pushed downward owing to the shape of such beak, so that when the rocking movement is made to open the jaws much more power is required, and the earth does not as readily fall in upon the seed as with the construction of my improved device.

Another advantage is that not nearly so much power is required to insert the device into the ground.

The form of bearing which I prefer to employ to hold the jaw D from movement while the lever is being rocked comprises an arm—such, for instance, as G—which has connected to it either directly or through another arm, such as H, which has a bearing or contact with the arm G, a blade I, which is inserted into the ground simultaneously with the insertion of the blade F and substantially parallel therewith, which gives a wide vertical bearing against which the thrust on the fulcrum-pivots of the handle may take effect.

The construction which I deem preferable is that shown in the drawings, the arm G being preferably a spring-arm and rigidly secured to the jaw D. The arm H is a rigid arm, preferably bifurcated, the bifurcations being pivoted on the rivets E and the blade I being fixedly secured to the outer end thereof.

I arrange a play or lost motion between the arms G and H about as shown by the space J between the ends of these arms in Fig. 1. On the arm H is a cross-bar or bearing K, which serves as a foot-bearing, by means of which the operator may by his foot force the device into the ground, simultaneously forcing in both the blades, as shown in Fig. 2, and when thus inserted the handle may be rocked and the seed planted in the manner before described.

The object of the lost motion between the two arms G and H is so that the hopper will not be accidentally opened in case the operator in bringing the device upon the ground should happen to rest the blade I upon a part of the ground slightly higher than the point at which the blade F should strike.

L is a tube which may be secured to the handle A in any desired manner in case a guide-tube is desired for feeding or guiding the seed from a higher point at which it may be dropped into the hopper below. The means I have shown for securing this to the handle comprises the band or bands M, encircling the tube and the handle, as shown in Fig. 4, with a clamping-bolt O for clamping the parts together. This tube preferably extends to a point above the hopper, and has at one side the depending flange P, extending down the side of the hopper, as shown in Fig. 3, leaving a space Q on one side beneath the tube to permit the foot of the operator to readily bear upon the plate or bar K for forcing the device into the ground. This flange P may be turned to either side of the hopper for a right or left handed man before tightening up the clamping-bolts O to secure it in position on the handle. Thus I form a device which may be used with or without a tube, and if used with a tube can be adjusted for right or left handed persons by a rotary adjustment of the tube, and which, as the tube has no function as a lever in locking the device, may be made very light. The tool as a whole is simple, light, and easily operated in any soil.

What I claim as my invention is—

1. In a planter, a handle, a jaw carried rigidly by the handle, a jaw hinged thereto, said jaws forming a hopper and an extension on the stationary jaw below the lower edge thereof for the purpose described.

2. In a planter, the combination with the handle of a shallow hopper formed of two jaws hinged together, a blade-like extension below the same on one jaw, means for holding one jaw from rocking and for rocking the blade to form a hole below the hopper.

3. In a planter, the combination with the handle, a jaw thereon, a jaw hinged thereto, the two jaws forming a hopper, of an arm for holding the hinged jaw stationary after its insertion into the ground, and a downwardly-extending blade on said arm adapted to enter the ground, for the purpose described.

4. In a planter, the combination with the handle, a hopper-jaw thereon, a hopper-jaw hinged thereto, a hinged arm supported on the pivot of the jaws, and adapted to have a bearing on the ground, an arm or bearing on the hinged jaw adapted to contact with said hinged arm to hold the hinged jaw stationary while the handle is rocked.

5. In a planter, the combination with the handle, the hopper thereon having a hinged jaw, a ground-bearing hinged to the pivotal joint of said jaw, and a bearing on the hinged jaw adapted to contact said hinged ground-bearing.

6. In a planter, the combination with the handle, the hopper thereon having a hinged jaw, an arm pivoted to the pivot thereof and adapted to bear on a point or bearing on the hinged jaw, and a foot-bar or plate on said arm.

7. In a planter, the combination of a handle, a hopper-beak at the lower end thereof, comprising a jaw fixed to the handle and a jaw hinged to said fixed jaw, means adapted to engage with the ground to hold the hinged jaw stationary, and a feed-tube detachably secured to said handle.

8. In a planter, the combination with the handle, the hopper-beak at the lower end thereof for the purpose described, a feed-tube leading to a point above the hopper, whereby a space is left between the latter and the end of the feed-tube and a foot bearing on the beak beneath the tube.

9. In a planter, the combination with the handle, the hopper-beak at the lower end thereof for the purpose described, a feed-tube, rotatorily adjustably secured to the handle, a flange at one side of the feed-tube which extends down to the hopper, and a foot bearing on the beak beneath the tube.

10. In a planter, the combination of the handle, the hopper-beak of the arm G secured to the movable member of the hopper, the arm H pivoted to the hopper, with a limited loose play between the two arms, substantially as described.

11. In a planter, the combination with the handle, the hopper-beak, the spring-arm G secured to the hinged member of the hopper, the arm H, hinged to the hopper, with a limited loose play between the two arms, substantially as described.

12. In a planter, the combination with the handle, the hopper-beak, the spring-arm G secured to the hinged member of the hopper, the bifurcated arm H hinged to the pivot of the hopper-sections, the blade thereon, and the bar or plate K on the arm H, forming the foot-rest, substantially as described.

In testimony whereof I affix my signature in presence of two witnesses.

FRED C. CHOATE.

Witnesses:
E. J. BOWMAN,
N. O. GUSWOLD.